United States Patent
Prigent et al.

(10) Patent No.: US 9,896,935 B2
(45) Date of Patent: Feb. 20, 2018

(54) HYDRAULIC TRANSMISSION DEVICE ALLOWING RELATIVELY QUIET COUPLING

(75) Inventors: André Prigent, Saintines (FR); Julien Lambey, Compiègne (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 1107 days.

(21) Appl. No.: 13/641,489

(22) PCT Filed: Apr. 5, 2011

(86) PCT No.: PCT/FR2011/050759
§ 371 (c)(1),
(2), (4) Date: Dec. 21, 2012

(87) PCT Pub. No.: WO2011/128556
PCT Pub. Date: Oct. 20, 2011

(65) Prior Publication Data
US 2013/0094986 A1    Apr. 18, 2013

(30) Foreign Application Priority Data
Apr. 16, 2010    (FR) ...................................... 10 52932

(51) Int. Cl.
*F01C 21/00*    (2006.01)
*B60K 17/356*    (2006.01)
(Continued)

(52) U.S. Cl.
CPC .......... *F01C 21/008* (2013.01); *B60K 17/356* (2013.01); *B60K 23/08* (2013.01);
(Continued)

(58) Field of Classification Search
CPC .. F16H 61/4183; F16H 61/4052; F16H 61/42; F16H 61/423; F16H 61/4139;
(Continued)

(56) References Cited

U.S. PATENT DOCUMENTS 3,972,186 A * 8/1976 Humphreys ......... B62D 11/183
60/425
4,766,727 A * 8/1988 Dull .................... B60K 17/356
137/625.48
(Continued)

FOREIGN PATENT DOCUMENTS

| EP | 0993982 A1 | 4/2000 |
| FR | 1411046 A | 9/1965 |
| FR | 1425800 A | 4/1966 |
| FR | 2499651 A1 | 8/1982 |
| FR | 2504987 A1 | 11/1982 |

(Continued)

OTHER PUBLICATIONS

International Search Report: dated Jun. 21, 2011; PCT/FR2011/050759.

*Primary Examiner* — Logan Kraft
*Assistant Examiner* — Abiy Teka
(74) *Attorney, Agent, or Firm* — Ladas & Parry LLP

(57) ABSTRACT

A hydraulic transmission apparatus having at least one declutchable hydraulic motor having radial pistons and connected via two motor ducts, and a casing duct connected to the inside of the casing. The apparatus further has clutching means that, in order to perform the clutching of the motor, are suitable for bringing a first one of the motor ducts to a "clutching" first pressure that is higher than the pressure in the casing while also making it possible to remove fluid via the casing duct. Disposed on the casing duct, the apparatus further has means for limiting the flow of fluid in said casing duct, in a manner such as to cause the pressure inside the casing to increase during the clutching operation. This apparatus enables clutching to take place gently.

21 Claims, 8 Drawing Sheets

(51) Int. Cl.
*B60K 23/08* (2006.01)
*F03C 1/047* (2006.01)
*F16H 61/4035* (2010.01)
*F16H 61/4183* (2010.01)
*F16H 61/439* (2010.01)
*B60K 7/00* (2006.01)

(52) U.S. Cl.
CPC ............ *F03C 1/047* (2013.01); *F03C 1/0478* (2013.01); *F16H 61/4035* (2013.01); *F16H 61/4183* (2013.01); *F16H 61/439* (2013.01); *B60K 7/0015* (2013.01)

(58) Field of Classification Search
CPC . F16H 61/4043; B60K 17/356; F03C 1/0457; F03C 1/0425; F03C 1/047; F03C 1/0472; F03C 1/0478; F01B 1/0689
See application file for complete search history.

(56) References Cited

U.S. PATENT DOCUMENTS

| | | | | |
|---|---|---|---|---|
| 4,914,592 | A | * | 4/1990 | Callahan ............... F16H 61/456 180/415 |
| 6,367,572 | B1 | * | 4/2002 | Maletschek ............ B60K 23/08 180/243 |
| 2009/0313985 | A1 | * | 12/2009 | Heren ...................... B60K 6/12 60/414 |
| 2010/0281860 | A1 | * | 11/2010 | Mears ..................... F15B 7/003 60/486 |

FOREIGN PATENT DOCUMENTS

| | | | | | |
|---|---|---|---|---|---|
| GB | 1314995 | A | * | 4/1973 | ............. F03C 1/0425 |
| GB | 2258695 | A | * | 2/1993 | ............. F03C 1/0535 |
| JP | 10281103 | A | * | 10/1998 | |

\* cited by examiner

HYDRAULIC TRANSMISSION DEVICE ALLOWING RELATIVELY QUIET COUPLING

The invention relates to hydraulic transmission apparatus comprising at least one hydraulic motor having radial pistons, said motor comprising:

a casing;

inside the casing, a cylinder block that comprises a plurality of cylinders each cylinder containing a slidably mounted piston and being disposed radially relative to an axis of rotation of the motor; and an undulating cam for the pistons;

the apparatus further comprising:

two motor ducts respectively for the fluid feed and for the fluid discharge of the motor, said motor ducts being suitable for being put into communication with said cylinders; and a casing duct connected to an internal space provided inside the casing and in which a "casing pressure" prevails; the motor being suitable for being clutched, in which state the pistons slide in the cylinders while being held in contact with the cam, and the motor is suitable for generating outlet torque under the effect of a difference in pressure between the motor ducts, and for being declutched, in which state the pistons are held in the retracted position inside the cylinders under the effect of the casing pressure;

Such apparatuses are, in particular, used for assistance purposes on a vehicle, in order to make it possible, whenever necessary, to actuate the hydraulic motor as a backup or assistance motor, when the driving conditions of the vehicle are difficult, such as when the terrain is slippery, steeply sloping, etc. The hydraulic motor is generally arranged on the vehicle on an axle on which the wheels are not driven wheels when the vehicle is in normal forward drive mode; in this way, when the hydraulic transmission apparatus is activated, the vehicle has additional driven wheels.

A particularly important use of the invention concerns hydraulic assistance apparatus mounted on road vehicles, such as heavy trucks that can travel at relatively high speeds. On such vehicles, it is advantageous for the assistance motor(s) to be activated while the vehicle is in forward drive, e.g. while it is travelling at more than 30 kilometers per hour (km/h).

Despite this need, and in general manner, most hydraulic transmission apparatuses of the type presented in the introduction are designed to enable the motors to be clutched only when the vehicle is at a standstill or travelling at very low speed.

The clutching stage is particularly difficult to achieve because it requires the pistons to be put into contact with the cam. Unfortunately, if the vehicle is moving, the pistons are rotating relative to the cam; the clutching thus gives rise to a series of sudden impacts between the pistons and the cam. Such clutching is noisy, and mechanically wearing on the motor.

In order to avoid this problem, provision is usually made for the speed of the vehicle to be reduced considerably at the time at which the motors are clutched.

However, certain apparatuses have been designed, in particular by the Applicant, in order to enable clutching to take place while the vehicle is travelling.

Thus, first known apparatus includes clutching means that, in order to perform the clutching, connect the motor ducts together while also subjecting them to the delivery pressure of an auxiliary pump. At the same time, the casing is brought to atmospheric pressure. At the time of clutching, the pressure in the motor ducts is greater than the pressure in the casing, and makes it possible for the pistons to be extended and therefore for the motor to be clutched.

Such apparatus is illustrated by Patent EP 0 993 982.

The drawback with that apparatus is that, while the motor(s) are being clutched, the pistons all extend together, gradually, the impacts between the pistons and the cam are repeated, and the clutching is unsatisfactory as mentioned above.

Patent EP 0 993 982 presents a second apparatus, similar to the above apparatus. In that second apparatus, during a brief period at the beginning of clutching, the motor ducts are connected to the main orifices of the main pump, while the casing duct is connected to the auxiliary pump. Thus, during this period, the casing is subjected at least to the pressure of the auxiliary pump. Then, during the last step of the clutching, the casing duct is brought to atmospheric pressure, thereby making it easier to remove fluid from the casing.

The drawback with that apparatus is that it requires a selection valve for connecting the casing duct either to the fluid removal duct (connected to the unpressurized reservoir), or else to the auxiliary pump. That results in a certain amount of complexity.

Another drawback with that system is that the pressure of the auxiliary pump prevailing in the casing at the time of the clutching is relatively high. Unfortunately, the clutching gives rise to pressure peaks, which add to that pressure. As a result, the pressure in the casing during those pressure peaks can damage the gaskets of the motor and give rise to the motor losing fluid-tightness.

An object of the invention is to provide transmission apparatus of the type presented in the introduction, the apparatus further comprising clutching means that, in order to clutch the motor, are suitable for bringing at least a first one of the motor ducts to a "clutching" first pressure that is greater than the casing pressure while also allowing fluid to be removed via the casing duct, which apparatus is simple and in which apparatus the clutching of the motor(s) can take place relatively rapidly, without damaging the motor(s), while minimizing noise, and while the rotor(s) of the motor(s) is/are rotating.

The object of the invention is achieved by the fact that the apparatus comprises, disposed on the casing duct, means for limiting the flow of fluid in said casing duct, in a manner such as to cause the pressure inside the casing to increase during the clutching operation.

The pressure inside the casing designates here the casing pressure or pressure in the internal space inside the casing, which pressure is itself equal to the pressure in the casing duct. This pressure is applied to the pistons and urges them to retract into the cylinders of the motor(s).

In the apparatus of the invention, the clutching operation proceeds in the following manner. As soon as the clutching pressure is applied to the motor ducts, and due to the difference in pressure that forms between the cylinders subjected to the clutching pressure and the casing, the pistons contained in said cylinders are urged to extend.

As soon as the pistons start to extend, and since fluid removal from the casing is limited by the means for limiting the flow, the pressure in the casing rises. A back pressure thus forms in the casing, having an effect opposing the effect of the pressure in the cylinders. This back pressure limits the speed at which certain pistons extend from the cylinders, the fluid present in the casing acting as a sort of buffer between the pistons and the cam.

As a result, the pistons extend towards the cam at a limited speed and with limited energy. Therefore, the violence of the impacts between the pistons and the cam is also limited. Thus, the invention makes it possible to reduce the violence of the impacts between the pistons and the cam, while also making it possible to apply high pressures to the motor duct(s). The invention thus makes it possible, in particular, to apply the delivery pressure of the main pump directly to the motor ducts, without it being necessary to use a specific connection to an auxiliary pressurized fluid source: simple means are used for limiting the flow of fluid in the casing duct. These means are dimensioned in such a manner as to reduce the violence of the impacts between the pistons and the cam, while also enabling the pistons to extend.

Advantageously, once the clutching is performed, the back pressure falls spontaneously, without requiring any action to be taken.

In the apparatus, the hydraulic motor or each of the hydraulic motors may comprise two or more motor ducts. The number of motor ducts may be greater than two, if the motor is arranged with sub-motors.

In an embodiment, the means for limiting the flow of fluid comprise a constriction. The constriction is a particularly simple and reliable way of causing the desired increase in pressure in the casing. Naturally, any other means (controlled progressive valve, etc.) suitable for limiting the flow of fluid in the casing duct may be used.

In an embodiment, the apparatus further comprises a pressure limiter disposed on the casing duct and suitable for limiting the increase in pressure in the casing. The term "pressure limiter" is used herein to designate a mechanism including a valve that opens when the pressure upstream from the mechanism exceeds a predetermined value, in such a manner that the mechanism prevents the upstream pressure from exceeding the predetermined value. The presence of the pressure limiter on the casing duct advantageously makes it possible to limit the pressure in the casing and thus, to prevent the gaskets of the motor being subjected to harmful pressure peaks.

In an embodiment, the apparatus further comprises a pressure-limiting check valve, mounted in parallel with the means for limiting the flow of fluid, disposed between the casing duct and an auxiliary source of pressurized fluid, and allowing fluid to flow only in the direction going from the casing towards said source.

Such a check valve is a simple way of implementing a pressure limiter. In addition, hydraulic transmission apparatus usually includes an auxiliary source of pressurized fluid, for supplying fluid at an intermediate pressure. That pressure is usually of the order of 10 bars to 30 bars, which is very suitable as a maximum back pressure in the casing, during clutching.

In an embodiment, the clutching means are suitable for maintaining the second motor duct at a second pressure less than the clutching pressure during the clutching operation, and the means for limiting the flow of fluid are dimensioned in such a manner that, during a major fraction of the clutching stage, the casing pressure remains between the first pressure and the second pressure.

Preferably, the clutching means maintain the casing pressure between the first pressure and the second pressure for most (more than 75%) of the clutching operation; but unwanted pressure oscillations can occur and cause the pressure to go temporarily below the pressure of the second motor duct, for example.

In radial-piston motors of the type to which the invention relates, the cylinders are put into communication in alternation with one and then with the other of the motor ducts. Usually, for each cylinder, this takes place by putting a cylinder duct, connected to the cylinder, into communication with various distribution ducts connected to the motor ducts.

The motor ducts and the cylinders are thus put into communication with one another in progressive manner. The flow section area between the distribution duct and the cylinder duct, which area is zero at some instant, increases, reaches a maximum value, and then returns to zero.

Thus, the pressure inside the cylinders does not merely have two values, depending on whether or not the cylinder is connected to one or the other of the motor ducts, but rather it varies continuously from one to the other of the pressures of the two motor ducts, with pauses during the stages for which the various cylinders are isolated.

As a function of the pressure that prevails inside the cylinders, an outward force of greater or smaller magnitude is exerted on the pistons that they contain, in order to push them outwards towards the cam. At any given instant, since the flow section areas and thus the pressures in the cylinders vary considerably, the outward forces exerted on the pistons also vary considerably.

In addition, the flow rate of fluid that can be injected into the cylinders in order to enable the pistons to extend is generally low, because it usually comes from a low delivery rate auxiliary pump. It is thus not possible, at any given time, for pistons to extend from their cylinders both in large numbers and at high speed; the apparatus limits the number of pistons extending and/or the speed at which they extend.

By means of the back pressure in the casing, this limitation takes place in the following manner at each instant:

the pistons that are least urged to extend from their cylinders, i.e. the pistons for which the pressure inside their cylinders is the lowest, do not extend from their cylinders, or are pushed back into their cylinders by the fluid if the pressure in their cylinders is less than the casing pressure;

conversely, the pistons subjected to high pressures inside their cylinders are pushed strongly towards the cam, and they extend rapidly from their cylinders.

Thus, advantageously, in this embodiment, the pistons do not all extend from their cylinders together, but rather they extend one after another (or possibly in small groups, as a function of the configuration of the motor).

At each instant, the number of pistons that are extending from their cylinders is relatively small. Therefore, the pistons that extend from the cylinders extend relatively rapidly, because the pressure in the first motor duct does not fall, since only a small number of pistons extend. For the same reason, these pistons that extend travel a distance towards the cam that is greater than if all of the pistons were to extend simultaneously.

Compared with when all of the pistons extend simultaneously, in this embodiment, there is thus an increased probability that the pistons that extend from the cylinders extend and reach the cam on a rising ramp thereof (portion of the cam with which a piston is in contact during a movement for extending from its cylinder), and thus without any impact or at least with a smaller impact than if they hit the cam on a falling ramp thereof.

The pistons extending successively rather than simultaneously, in this embodiment, makes it possible for the number and the violence of the impacts of pistons against the cam to be significantly reduced, and for the noise caused by the clutching operation to be reduced considerably.

In addition, the back pressure in the casing generates a return force that tends to push the pistons back into the cylinders, when the pressure inside their cylinders is lower than the back pressure. As a result, if a piston has not had time to reach the cam during an outward movement, then, once the pressure inside its cylinder decreases again, and becomes less than the back pressure, the piston is pushed back and retracts at least in part into its cylinder. If, despite this movement, the cam comes to hit the piston, the impact on said piston is small.

Finally, when a piston comes into contact with the cam, it tends to remain in contact with it. Thus, very rapidly all of the pistons extend, and are in contact with the cam.

In an embodiment, in parallel with the means for limiting the flow of fluid, the clutching means are suitable, during the clutching operation, for connecting the casing duct via a rated valve to the second motor duct, in order to limit the pressure in the casing.

Thus, the pressure in the casing duct does not exceed the pressure in the second motor duct by more than a predetermined value. Advantageously, excessive pressure in the casing is avoided, and the gaskets of the motor are protected. In addition, the pressure differential between the second motor duct and the casing is thus controlled, which, as a result makes it possible to control the return force that pushes the pistons back into their cylinders. Thus, it is possible to ensure that the pistons are pushed back sufficiently gently and without damage into their cylinders.

In addition, the fluid being removed from the casing towards the second casing duct increases the quantity of fluid injected into the motor ducts, thereby facilitating the increase in pressure in said motor ducts, and thus accelerating the clutching operation.

In an embodiment, the apparatus further comprises a main pump; the clutching means are suitable for putting a main delivery orifice of the main pump into communication with the first motor duct during the clutching operation so as to make it possible to feed the motor; the motor is connected to at least one wheel so as to drive it; and the clutching means suitable, before the clutching operation is performed, for synchronizing the main pump by causing the cylinder capacity of said pump to vary until it reaches a value making it possible to drive the motor at a speed of rotation different by less than 25% from the speed of the wheel.

The main pump may be a pump operating in open circuit. In which case, in a manner known per se, there is no boost pump; that one of the two motor ducts that is not connected to the delivery orifice of the pump is connected to an unpressurized reservoir and enables fluid to be discharged from the motor.

Advantageously, the main pump being synchronized, i.e. the cylinder capacity of the main pump being set to a value appropriate, in this example, for driving the motor in rotation at a speed that differs little from the speed of the wheel, makes it possible, during the clutching operation, and in view of the fact that some of the pistons have not yet extended fully, to have a delivery rate from the pump that is sufficient to maintain the pressure in the first motor duct and thus, makes it possible for the pistons to extend rapidly and for clutching to take place rapidly.

In an embodiment, the apparatus further comprises a main pump and an auxiliary pump, and the clutching means are suitable for connecting a delivery orifice of the auxiliary pump to the first motor duct during the clutching operation. This embodiment relates to apparatus in which the clutching is performed by means of the auxiliary pump. This auxiliary pump then puts the first motor duct under pressure, the second motor duct preferably remaining at atmospheric pressure during this operation.

In an embodiment, the clutching means are suitable, during the clutching operation, for connecting the casing duct to the second motor duct.

By means of this arrangement, the fluid removed from the casing via the casing duct goes into the second motor duct, thereby facilitating maintenance of a certain amount of extra pressure in this duct and making it possible to ensure that the pistons that have come into contact with the cam remain continuously in contact therewith.

In an embodiment, in parallel with the means for limiting the flow of fluid, the clutching means are suitable for connecting the casing duct to a fluid supply duct via a check valve for filling the casing, making it possible to supply fluid to the casing, in particular during the operation of declutching the motor.

This arrangement makes it possible, during the declutching operation, to inject fluid into the casing, with a flow rate that is not limited by the means for limiting the flow of fluid, thereby making it easier to obtain a relatively high flow rate, and also making it possible to perform the declutching operation in a very short time.

In an embodiment, the apparatus further comprises an accumulator suitable for feeding the casing duct for putting this duct under pressure during an operation of declutching the motor, thereby making it easier for the pistons to retract into the cylinders.

The accumulator may be a hydraulic accumulator of the rechargeable spring or gas type that contains pressurized fluid and that is capable of storing hydraulic energy in the form of hydrostatic energy and of restoring hydraulic energy from the stored hydrostatic energy.

Such an accumulator is capable of supplying a certain quantity of fluid very rapidly, thereby making it possible to reduce the duration of the declutching operation. In addition, this accumulator makes it possible to fill the closed loop via means that are not of limited delivery rate unlike an auxiliary pump or a boost pump, and thus makes it possible to use a boost pump that is compact.

The invention can be well understood and its advantages appear more clearly on reading the following detailed description of an embodiment shown by way of non-limiting example. The description refers to the accompanying drawings, in which:

FIG. 1A shows a vehicle 10 in which apparatus 20 of the invention is mounted.

Figure 1A:
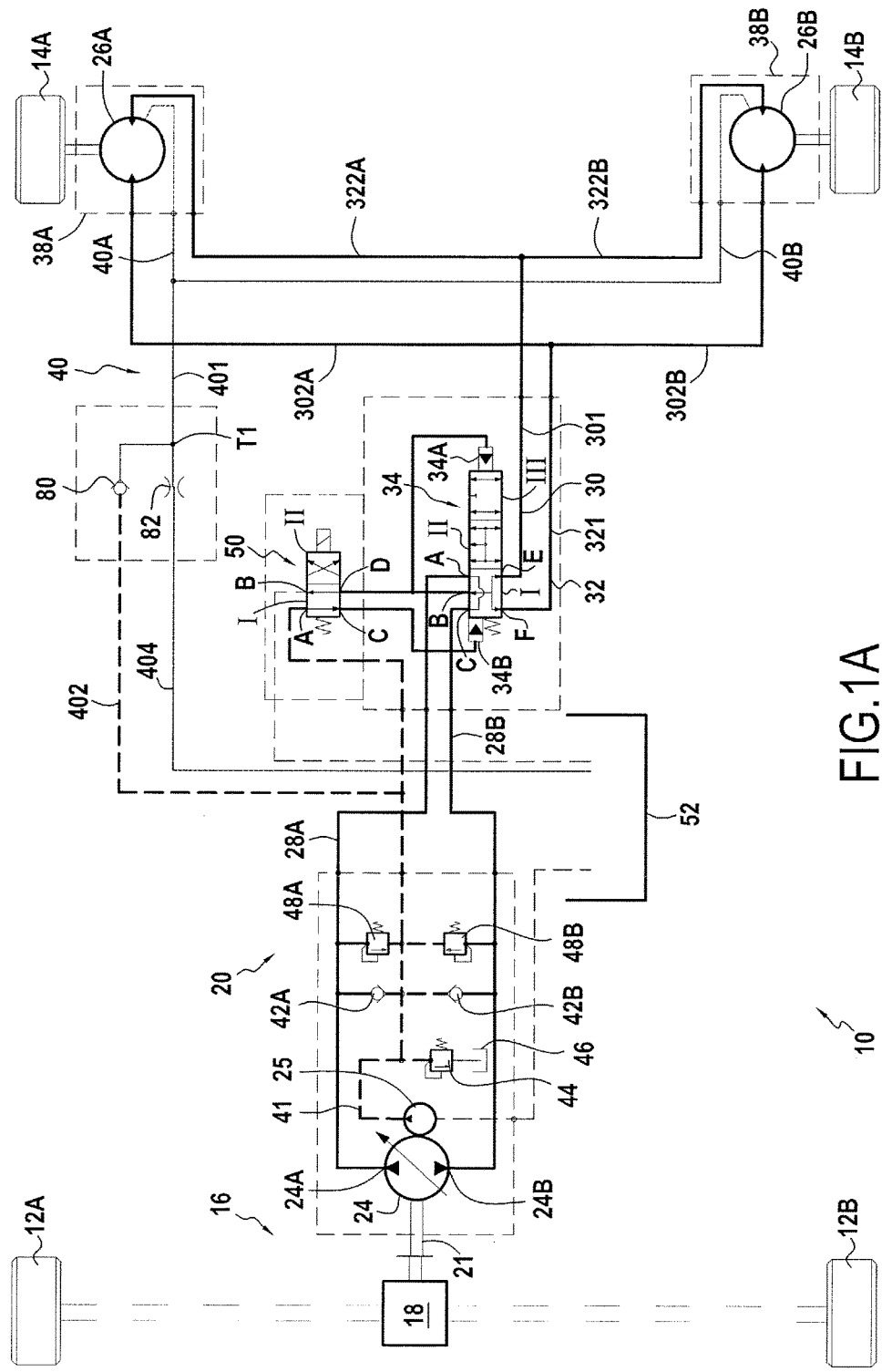
FIG. 1A is a diagrammatic view of a first embodiment of an apparatus of the invention.

The vehicle 10 is a vehicle having four wheels, namely two rear wheels 12A, 12B, and two front wheels 14A, 14B. In the normal state, the drive for the vehicle is provided by a main transmission 16. The main transmission includes a diesel engine 18 that is connected to the rear wheels 12A and 12B and that provides the drive for the vehicle under normal circumstances.

In addition, for propelling the vehicle under difficult road conditions (sloping road, slippery road, etc.), the vehicle also has an auxiliary transmission 20. Said auxiliary transmission makes it possible to render the two wheels 14A and 14B driven wheels even though they are not driven wheels under normal circumstances. Thus, by means of the auxiliary transmission 20, the vehicle has an assisted mode in which all four wheels 12A, 12B, 14B, and 14B are driven wheels.

The auxiliary transmission 20 is coupled to a shaft 21 that is connected to the power outlet coming from the engine 18, from which it draws the energy that it transmits to the wheels 14A, 14B when it is activated.

The auxiliary transmission 20 constitutes hydraulic transmission apparatus that transmits a fraction of the energy from the engine 18 to the wheels 14A, 14B, and that also performs various additional functions: activation/deactivation of the auxiliary transmission; making the auxiliary transmission members safe during the deactivated mode, etc.

For driving the wheels 14A, 14B, the hydraulic transmission apparatus 20 firstly includes two pressurized fluid sources: a main pump 24, and an auxiliary pump 25 designed to maintain a minimum fluid pressure in various auxiliary ducts of the apparatus.

The main pump 24 is a reversible pump having a variable delivery rate and a swashplate.

Both the main pump 24 and the auxiliary pump 25 are connected to the outlet shaft 21 of the engine 18, and can therefore be actuated by it together (i.e. at the same time).

The main pump 24 is designed to feed pressurized fluid to two hydraulic motors 26A, 26B coupled to respective ones of the two wheels 14A, 14B. For this purpose, the pump 24 has two pump ducts 28A, 28B connected to its main orifices 24A, 24B.

These pump ducts 28A, 28B may be put into communication with respective ones of the two motor ducts 30, 32. Each of these motor ducts has a first portion 301, 321 suitable for being connected to a pump duct, and a second portion in which each duct splits into two branches 302A, 302B, and 322A, 322B respectively, which branches are connected to feed and discharge enclosures of the motors 26A and 26B.

In a manner known per se, the motors 26A, 26B are hydraulic motors having radial pistons, similar to the motors described, for example, in French patent No. 2 504 987.

Each of the motors 26A, 26B has an outlet shaft, connected to a respective one of the wheels 14A, 14B. Under the effect of the pressure difference imposed by the main pump between the pump ducts, and thus between the motor ducts, in the assisted mode the motors 26A and 26B deliver drive (or braking) torque that enables them to drive the wheels 14A, 14B.

The pump ducts 28A, 28B and the motor ducts 30, 32 are put into communication by means of an activation valve 34. This valve has three upstream ports A, B, C, two downstream ports E and F, and three positions I, II, III. The activation valve 34 also has two hydraulic control chambers 34A, 34B.

In this text, the terms "upstream" and "downstream" as applied to the ports of a valve designate, in general, the most frequent direction of flow of fluid or of transmission of a command, without this excluding other operating modes.

Ports A and C are connected to respective ones of the pump ducts 28A and 28B. Both the control chamber 34A and port B are connected to port D of a control valve 50 that is described below. Ports E and F are connected to respective ones of the motor ducts 30 and 32 and therefore to respective ones of the motor ducts 302A and 322A connected to the motor 26A, and to respective ones of the motor ducts 302B and 322B connected to the motor 26B.

The activation valve 34 is also provided with a return spring that urges the valve 34 to stay in the first position I.

In the first position I, ports B, E, and F are interconnected, and ports A and C are interconnected.

In the second position II, all five ports A, B, C, E, and F are interconnected.

In the third position III, ports A and E are interconnected, ports C and F are interconnected, and port B is isolated.

Thus, in the first position I, the pump ducts 28A, 28B are interconnected (bypass position); the pump is then set to zero delivery rate. In addition, the motor ducts are interconnected, and their pressure is imposed on them by the control valve 50, in a manner that is presented below.

Conversely, in the third position III, the motor ducts are connected to the pump ducts and they feed the motors 26A, 26B so that they drive the wheels 14A, 14B. This position is used to place the vehicle in assisted mode, in which the motors 26A, 26B are in the clutched state, except during the transient stages.

The apparatus 20 is fed with fluid in the following manner.

The delivery orifice of the auxiliary pump 25 is connected to a boost duct 41.

The duct 41 is connected to the pump ducts 28A, 28B via check valves 42A, 42B. This connection makes it possible to ensure that the pressure in the pump ducts remains at all times at the same level as the boost pressure (pressure at the delivery outlet of the pump 25).

In addition, the duct 41 is connected to an unpressurized reservoir 46 that is at atmospheric pressure, via a pressure limiter 44, thereby preventing any excessive increase in pressure in the duct 41.

Similarly, the pump ducts 28A, 28B are connected to the duct 41 via pressure limiters 48A, 48B, also in order to avoid any excessive pressure.

Finally, inside the casings 38A, 38B of the motors, internal spaces are provided that communicate with ducts for leakage return that are referred to as "casing ducts" 40A and 40B. The internal arrangement of the hydraulic motors of the apparatus 20 is described in more detail below with reference to FIG. 2.

The casing ducts 40A, 40B are connected together to a common segment 401, in such a manner as to constitute a casing duct 40 made up of two segments 40A and 40B connected to respective ones of the motors 26A, 26B, and to the common segment 401.

In the description below, it is considered, by convention, that the upstream of the casing duct corresponds to the end situated in the vicinity of the motors 26A, 26B.

Downstream from the segment 401, at a junction T1, the casing duct 40 splits into two. It is connected to a duct 402 via a check valve 80, and to a duct 404 via a constriction 82.

The duct 404 is connected to a reservoir 52 at atmospheric pressure. The constriction 82 that limits removal of fluid to the reservoir 52, constitutes means for limiting the flow of fluid in the casing duct.

The duct 402 is connected to the boost duct 41. The pressure in this duct is thus the boost pressure, which prevails at the delivery orifice of the auxiliary pump 25. The check valve 80 is disposed in the direction enabling fluid to flow from the casing to the boost duct 41.

The transmission apparatus 20 also includes the above-mentioned control solenoid valve 50, thereby making it possible to place it in assisted mode or in unassisted mode.

This solenoid valve 50 is disposed on the boost duct 41. It has two upstream ports A and B, two downstream ports C and D, two positions I and II, and a return spring that urges it to stay in its position I.

Port A is connected to one end of the boost duct 41. Port B is connected to the unpressurized reservoir 52 that can be the same as the reservoir 46). Port C is connected to the hydraulic control chamber 34B of the valve 34. Port D is connected to the hydraulic chamber 34A and to Port B of the valve 34.

In position I, ports A and C are interconnected, and ports B and D are interconnected. In position II, ports A and D are interconnected, and ports B and C are interconnected.

The hydraulic transmission apparatus 20 is controlled by means of the solenoid valve 50. The solenoid valve is placed in position II to activate the apparatus and go over to the assisted mode, and in position I to deactivate it and return to unassisted mode.

In unassisted mode, the pump ducts 28A and 28B are connected, via the activation valve 34 placed in position I. The motor ducts are connected via port D of the valve 50 to the reservoir 52 and are maintained at atmospheric pressure. Similarly, since the casing duct is connected to the reservoir 52, the casing pressure remains equal to atmospheric pressure.

The valve 50 going from position II to position I triggers the operation of clutching the motors 26A, 26B.

When the control valve is caused to go from position I to position II, the "boost pressure" delivered by the auxiliary pump 25 is applied to the hydraulic chamber 34A instead of to the chamber 34B. This causes the hydraulic valve 34 to go from position I (unassisted mode) to position III (assisted mode).

Almost instantly, the delivery pressure of the main pump is transmitted to the first motor duct 32, while the pressure at the suction orifice of the pump 24 is applied to the second motor duct 30.

At the same time, the pressure in the casing, which pressure is initially equal to atmospheric pressure, starts to rise because, under the effect of the high pressure applied to the first motor duct, the pistons connected to said duct are pushed out of the cylinders by the fluid pressure. A certain quantity of fluid must thus be removed suddenly from the casings of the motors 26A, 26B. Because of the constriction 82, the removal of the fluid via the duct 404 towards the reservoir 52 is relatively slow. Thus, the pressure in the casing duct 40 rises. When it reaches the pressure in the boost duct 41, the check valve 80 opens and enables the surplus fluid to be removed to the boost duct. The pressure in the casing duct 40 can therefore not exceed the delivery pressure of the auxiliary pump 25.

Figure 1B:
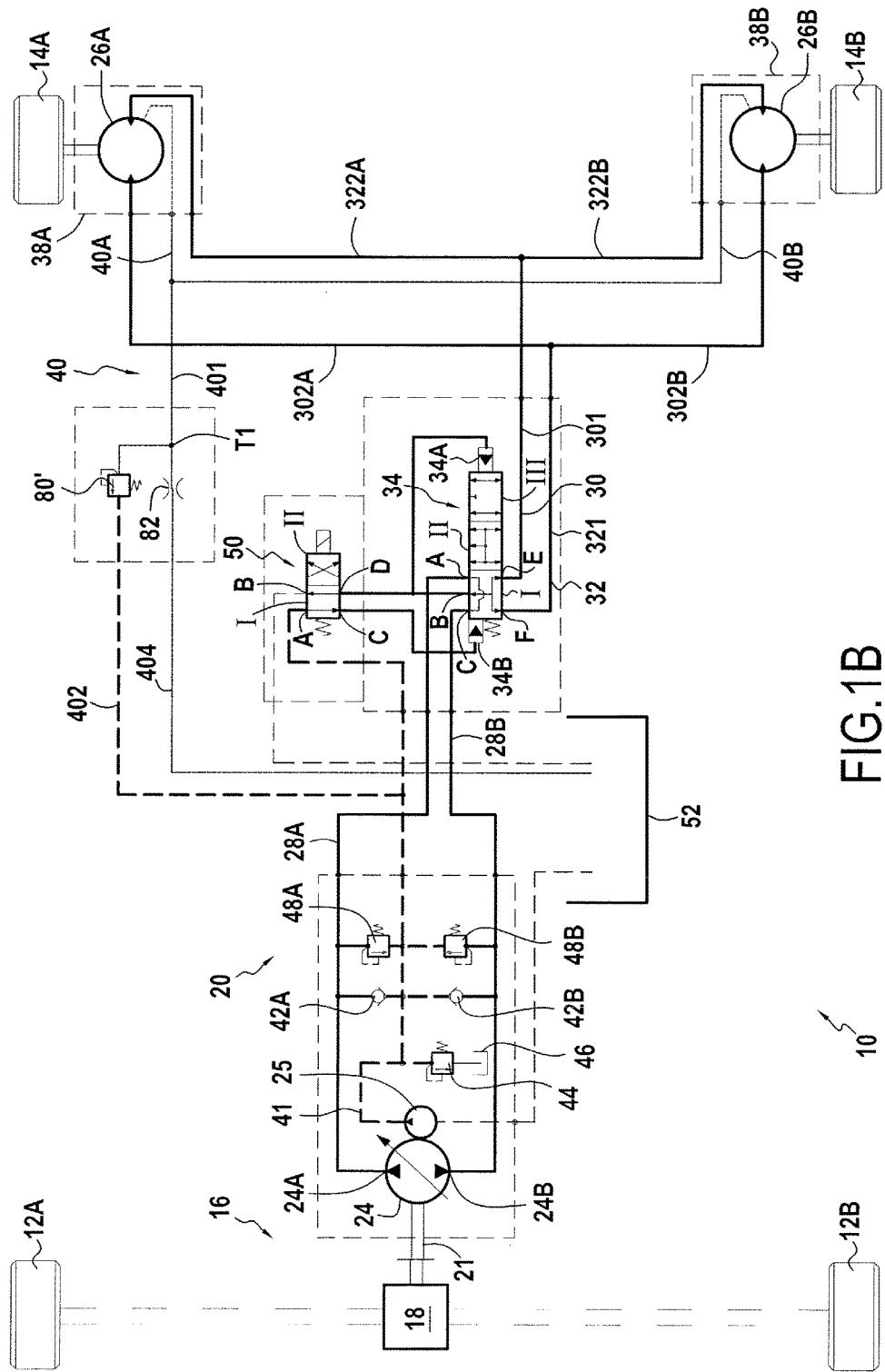
FIGS. 1B and 1C show two apparatuses, each of which is similar to the apparatus of FIG. 1A, and propose alternatives for replacing the check valve of the FIG. 1A apparatus.
Figure 1C:
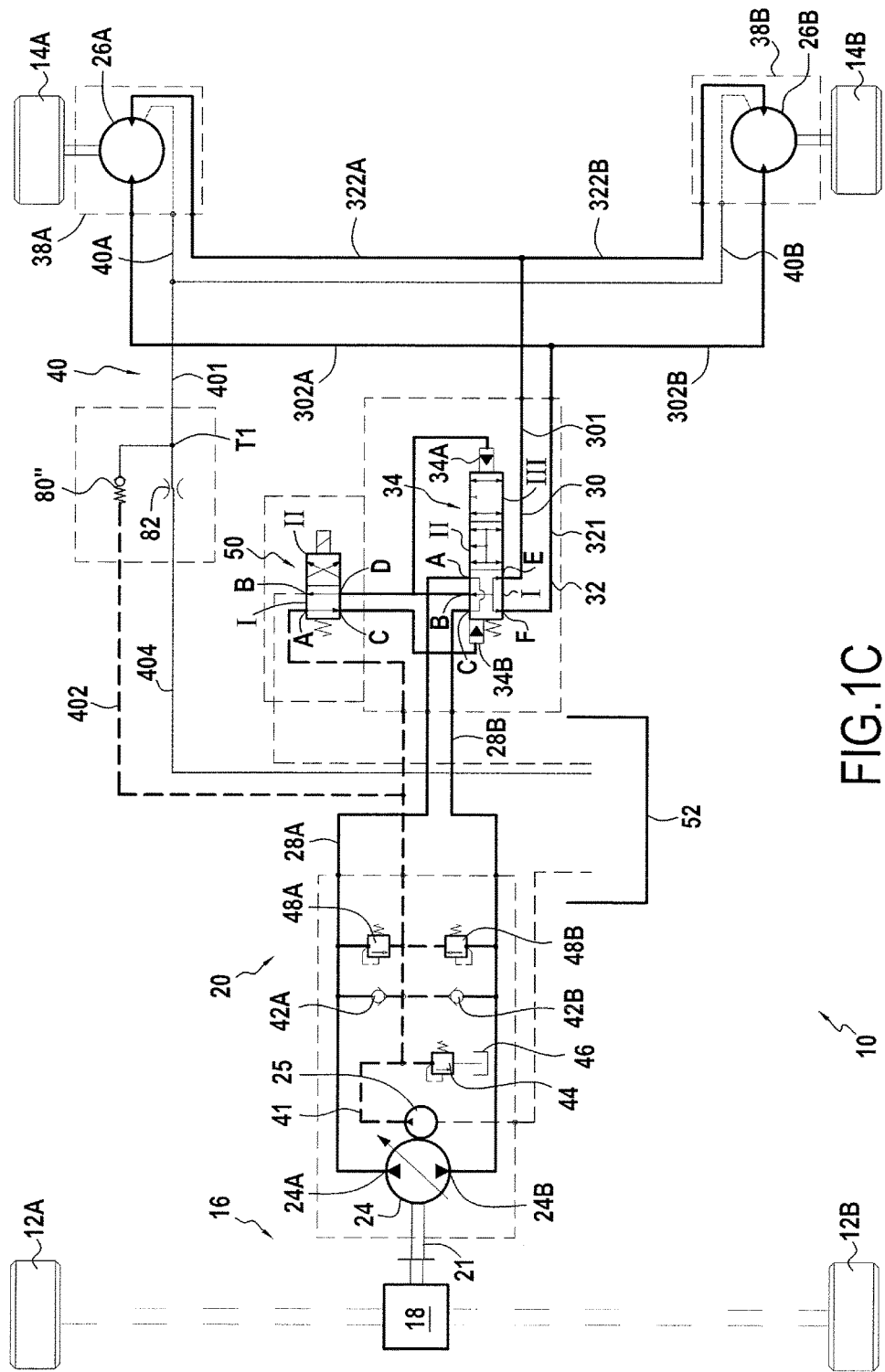

FIGS. 1B and 1C show two apparatuses that are entirely identical to the FIG. 1A apparatus except for the check valve 80. These figures show two components that may replace the check valve 80.

A first possibility (FIG. 1B) consists in replacing the check valve with a pressure limiter 80'. The pressure limiter opens progressively as the pressure upstream reaches and exceeds a predetermined value, thereby making it possible to remove fluid. In the example shown, fluid is removed to the boost duct, but it may also be removed to the unpressurized reservoir 52.

A second possibility (FIG. 10) consists in replacing the check valve 80 by a rated valve 80". The rated valve then opens when the upstream pressure (the casing pressure) exceeds the pressure in the boost line by more than a predetermined value. At the time of clutching, the boost line feeds the second motor duct, in order to maintain a pressure therein that is sufficient to avoid cavitation. Directing the fluid coming from the casings to the boost duct, and thereby to the second motor duct makes it possible to supply fluid to the second motor duct, and thus to facilitate maintaining sufficient pressure in this duct, despite the drop in pressure caused by the suction of the main pump.

The sequence whereby the pistons extend from the cylinders during the clutching is described below with reference to FIG. 2.

Figure 2:
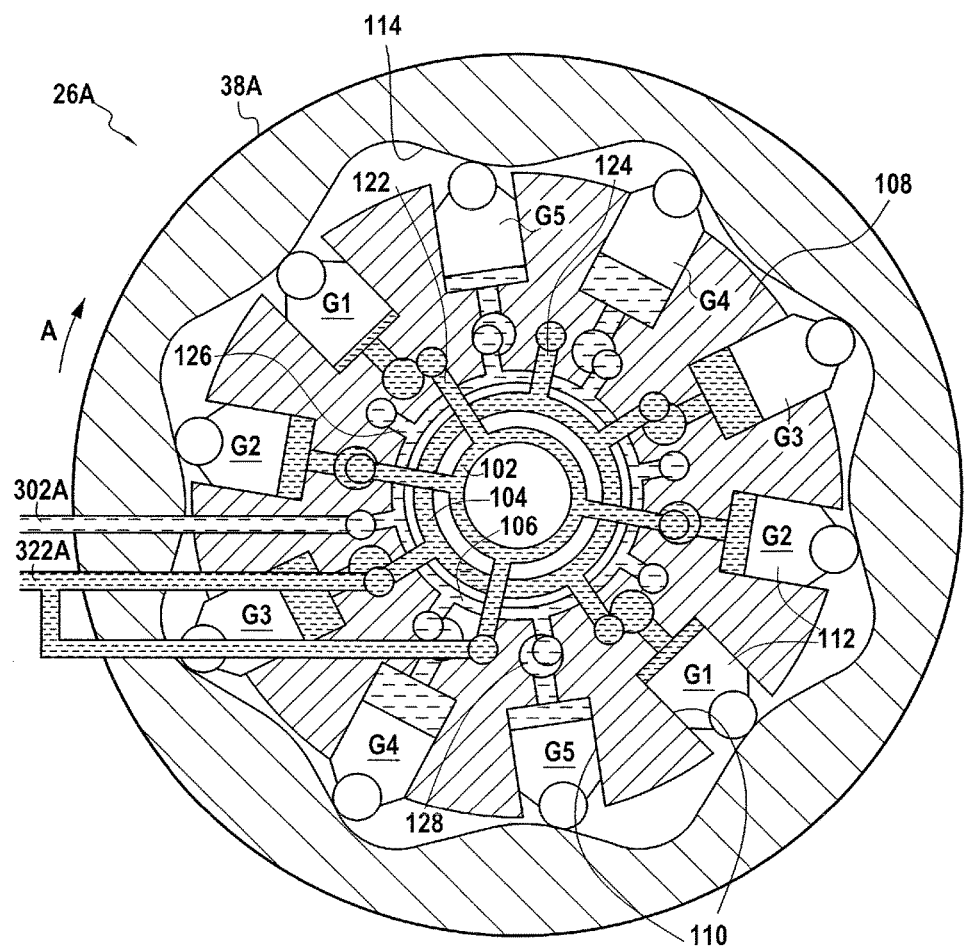
FIG. 2 is a section view perpendicular to its axis of rotation, of a motor that can be used in apparatus of the invention.

FIG. 2 is a cross-section view of the motor 26A (identical to the motor 26B).

This motor 26A is characterized by the fact that it has three feed/discharge enclosures in the form of grooves 102, 104, 106, formed inside a cylinder block 108. Therefore, this motor could be operated as being made up of two sub-motors, and could operate with a plurality of cylinder capacitors rather than a single cylinder capacity.

Indeed, it should be noted that the invention may naturally be applied to motors made up of a plurality of sub-motors. In which case, the invention may be applied independently for clutching any one of the sub-motors.

In the motor 26A, grooves 102 & 104 are interconnected and connected to motor duct 322A, and groove 106 is connected to motor duct 302A.

The motor 26A comprises:

in a casing 38A, the above-mentioned cylinder block 108, which comprises ten cylinders 110, each of which contains a slidably mounted piston 112 and is disposed radially relative to an axis of rotation of the motor; and an undulating cam 114 forming eight lobes, formed inside the casing 38A, and serving as a reaction member for the pistons 112.

The motor 26A is a motor having an external cam and an internal cylinder block; the invention may be applied to a motor having an internal cam and an external cylinder block. In addition, the cylinder block may be stationary and the cam rotary, or vice versa.

Fluid is fed to and discharged from the motor 26A via the two motor ducts 322A and 302A by the grooves 102, 104, 106. Each of the grooves 102, 104, 106 communicates with radial distribution ducts, namely, respectively, with four, four, and six radial distribution ducts 122, 124, 126.

These distribution ducts 122, 124, 126 are suitable for being put into communication successively with cylinder ducts 128, in known manner, as a function of the position of the cylinder block 108 relative to the cam 114.

For this purpose, the cylinder ducts 128 open out onto a "communication" outside plane surface of the cylinder block 108. Facing this communication surface, the motor 26A has a distributor having a "distribution" plane surface that is subjected to rotation relative to the communication surface while the cylinder block is rotating. The distribution ducts open out onto the distribution surface.

During the above-mentioned relative rotation, each cylinder duct 128 is put into communication in alternation with a distribution duct 122 or 124, and then with a distribution duct 126. The pressure in the cylinder ducts is brought successively to the pressure of the first motor duct, and then to the pressure of the second motor duct, and then to the pressure of the first motor duct again, etc.

The cylinder ducts and distribution ducts are put into communication with one another progressively, the flow section area, in the plane of the distribution or communication surfaces, starting from a zero value, increasing progressively to a maximum, and then progressively returning to a zero value.

The effect of these changes in pressure makes it possible, in the description below, to understand more clearly how the clutching operation proceeds.

At the initial instant t0 of the clutching operation (FIG. 2), all of the pistons are retracted into the cylinders. It is considered that the cylinder block 108 is turning relative to the cam 114 in the direction indicated by arrow A, and, in addition, it is assumed that it is the motor duct 322A that is brought to the high pressure of the pump (clutching pressure).

At instant t0, it is possible to distinguish between five groups of pistons that are urged to a greater or lesser extent to extend from their cylinders as a function of the flow section area between their cylinder ducts and distribution ducts:

two pistons "G1" are just beginning to be connected to the first motor duct 322A, and are thus hardly being urged to extend at all;

two pistons "G2" are very largely connected to the duct 322A, and are being strongly urged to extend;

two pistons "G3" are still connected to the duct 322A, but the flow section area is decreasing, and they are no longer being urged very much to extend;

two pistons "G4" are connected to the second motor duct 302A; and two pistons "G5" are still, for a few instants, connected to the duct 302A.

At instant t0, the pressure in the casing is equal to atmospheric pressure.

As soon as the delivery pressure of the pump 24 is applied to the duct 322A, the pistons of the cylinders connected to the duct start or do not start to extend, depending on the magnitude of the pressure to which they are subjected.

Therefore, the casing pressure starts to rise immediately, the constriction 82 producing its effects and limiting the removal of the fluid from the casing. Under the effect of this back pressure, the pistons G4 and G5 (movement of which is not indicated above) are actually urged to remain inside their cylinders, and they do not extend, because their cylinder pressures equal to the low pressure of the second motor duct 302A are less than the casing pressure.

To sum up, in the initial stage of clutching, the pistons G2 extend from their cylinders rapidly, and the other pistons G1 and G3-G5 do not extend from their cylinders or hardly extend at all therefrom.

The clutching operation continues in the following manner.

At each sixteenth of a turn, since the distribution ducts on the periphery of the distribution surface are connected alternately to the first motor duct and to the second motor duct, each of the cylinder ducts goes from the pressure of the first duct to the pressure of the second duct or vice versa.

At each instant, only the pistons that are strongly urged to extend do actually extend from their cylinders. The back pressure prevailing in the casing constrains the pistons that have their cylinder ducts not fully connected to the first motor duct to remain inside the cylinders. As a result, the pistons extend in pairs, because, at any given instant, only two cylinders are fully in contact with the motor duct 322A.

As a function of the settings of the apparatus, and in particular, as a function of the dimensioning of the means for limiting the flow of fluid (the constriction 82), at the end of their outward movement, either the pistons reach the cam, or else they stop before they come into contact with it. In general, the pistons do not reach the cam during their first outward movement, but rather they reach it during the second movement.

For each piston, the end of the outward movement takes place when the cylinder of the piston is no longer connected to the first motor duct.

Whereupon the back pressure urges the piston to retract into its cylinder. The piston thus spontaneously starts to move back into the cylinder. During this movement, if said movement does not take place rapidly enough, the piston might be hit by the cam. However, since the piston is moving into its cylinder, the violence of the impact between the cam and the piston is considerably attenuated.

As the various pistons are extending, an increasing quantity of fluid is removed from the casings of the motors, and a corresponding quantity of fluid is injected into the closed loop interconnecting the pump ducts and the motor ducts.

As a result, very rapidly, the pistons the most urged to extend are urged outwards sufficiently to go as far, while they are moving out, as to come into contact with the pump. Thus, gradually, all of the pistons extend and finally come into contact with the cam.

The key point of the invention lies in the back pressure in the casing, which pressure prevents the pistons from extending simultaneously and, on the contrary, makes it easier for them to extend rapidly and in staggered manner. The pistons extend in pairs only, thereby making it possible for the volume of fluid that is to be removed from the casing to remain relatively small. This volume is also the volume that the auxiliary pump 25 must supply to the motor ducts.

Since this volume is relatively small, the delivery rate of the pump 25 suffices to maintain a high pressure in the second motor duct 322A, thereby ensuring that all of the pistons that have reached the cam remain in contact therewith.

Finally, it should be noted that as soon as the casing pressure reaches the delivery pressure of the auxiliary pump 25, the surplus fluid removed via the casing duct is returned to the boost duct 41, and is thus added to the fluid delivered by the pump 25 to the motor ducts.

FIGS. 3 to 6 show four embodiments of apparatus of the invention. These apparatuses are very similar to one another and are described below with reference mainly to FIG. 3. Elements that are identical or similar bear like references in these various figures.

Figure 3:
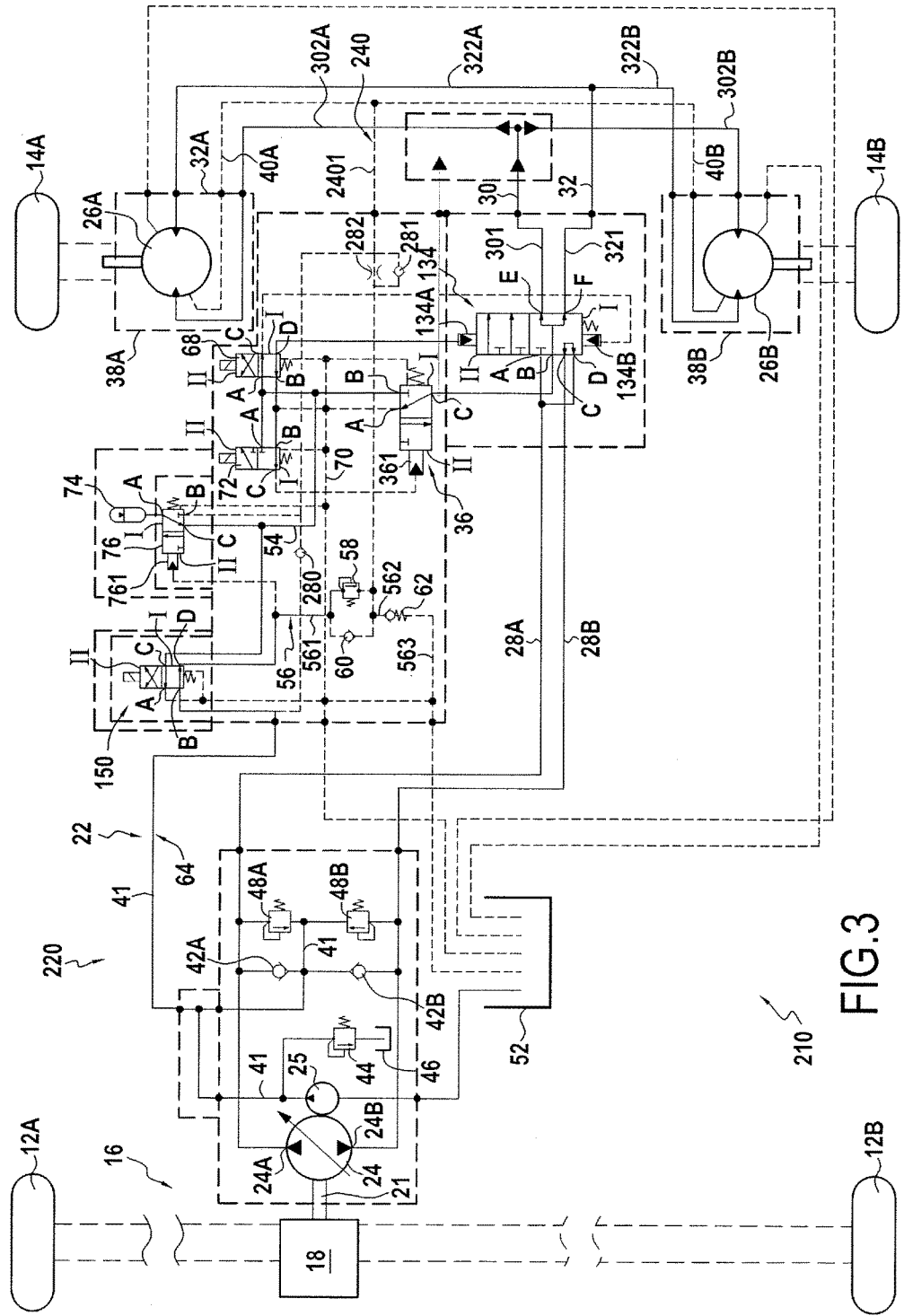
FIGS. 3 to 6 are diagrammatic views of apparatuses of the invention, in three embodiments presenting various possibilities for implementing the invention.

The difference between these various embodiments lies essentially in the arrangement of the means for limiting the flow of fluid, and of the check valves in particular for filling and for pressure limiting (references 280, 281, and 282 in FIG. 3).

FIG. 3 shows a vehicle 210 in which apparatus 220 of the invention is mounted.

The vehicle 210 is similar to the above-described vehicle 10. An activation valve 134 is interposed between the pump ducts 28A, 28B and the motor ducts 30, 32. Said activation valve has four upstream ports A, B, C, & D, two downstream ports E and F, two positions I & II, and two control hydraulic chambers 134A & 134B.

Ports A and D are connected to the pump duct 28A. Port C is connected to the pump duct 28B. Ports E and F are connected to the motor ducts 30 and 32. Port B is connected to a pressure control valve 36.

The activation valve 134 is also provided with a return spring that urges it to stay in the first position I.

In the first position I, port A is isolated, port B is connected to ports E and F, and ports C and D are interconnected.

In the second position II, ports B and D are isolated, ports A and E are interconnected, and ports C and F are interconnected (ports A and D remain interconnected and connected to the pump duct 28A).

Thus, in the first position I, the pump ducts 28A, 28B are interconnected (bypass position); the pump is then set to zero delivery rate. In addition, the motor ducts are interconnected, and their pressure is the pressure that is imposed on them by the pressure control valve 36, in a manner that is presented below.

Conversely, in the second position II, the motor ducts are connected to the pump ducts and they feed the motors 26A, 26B so that they drive the wheels 14A, 14B, which constitutes the assisted mode of the apparatus.

A "bypass" solenoid valve 150 is disposed on the boost duct. This valve has two upstream ports A and B, two downstream ports C and D, and two positions I and II.

Port A is connected to the unpressurized reservoir 52. Port B is connected to one end of the boost duct 41. Port C is connected to a "transmission" duct 54, the function of which is described in detail below. Port D is connected to a "bypass" duct 56.

The bypass valve 150 is also provided with a return spring that urges it to stay in the first position I.

In the first position I, ports A and C are interconnected, and ports B and D are interconnected.

In the second position II, ports A and D are interconnected, and ports B and C are interconnected.

The first position I is the default position for the bypass valve 150 and is the "deactivated" position, corresponding to the unassisted mode (normal drive). In this position, the fluid coming from the boost pump is directed towards the bypass duct 56, and the transmission duct 54 is maintained at a pressure equal to atmospheric pressure.

The second position II of the bypass valve is the activated mode of the transmission apparatus 220, corresponding to the "assisted" mode for the vehicle. In this second position, the bypass valve directs the flow from the boost pump towards the transmission duct 54, which is an auxiliary duct of the apparatus 220.

The bypass duct 56 is in three portions, namely an upstream portion 561, a middle portion 562, and a downstream portion 563.

The upstream portion 561 and the middle portion 562 are interconnected via a pressure limiter 58 and via a check valve 60 that are mounted in parallel. The check valve is mounted in the direction that prevents the fluid from moving towards the middle portion 562.

The pressure limiter 58, controlled by its upstream pressure, makes it possible to maintain a minimum pressure, chosen to be equal to 10 bars, in the upstream portion 561.

The middle portion 562 and the downstream portion 563 are interconnected via a rated valve 62. The rated valve guarantees that a minimum pressure is maintained in the middle portion, which pressure is chosen to be equal to 0.5 bars.

The boost duct 41 associated with the bypass duct 56 form a "bypass" link 64. This link thus connects the delivery orifice of the auxiliary pump 25 to the unpressurized reservoir 52.

As explained above, the boost duct 41 is connected to the pump ducts 28A and 282 (via check valves 42A, 42B).

Therefore, in assisted mode (valve 50 in position I), the pressure of 10 bars (more precisely 10.5 bars) maintained by the pressure limiter 58 in the upstream portion of the bypass link (grouping together the boost duct 41 and the upstream portion 561 of the bypass duct) is applied in the pump ducts.

This pressure, that is applied to the pump ducts via the check valves 42A, 42B is high enough for the pump 24 to be protected. For this reason, the pressure maintained by the limiter 58 is referred to as the "pump protection pressure", and the upstream portion of the bypass link is referred to as the "pump protection portion".

The middle portion 562 of the bypass duct 56 is connected to the common segment 2401 of the casing duct 240. Therefore, the pressure in the casing duct remains at all times no more than 0.5 bars (rating pressure of the valve 62). However, in transient manner, the pressure can rise to a greater extent in said middle portion 562, due to the fact that the maximum flow rate that the valve 62 can remove is relatively limited. This effect can be added to the effect of the constriction 282.

The activation valve 34 is controlled by a first pilot valve 68.

This pilot valve is a solenoid valve having two upstream ports A and B, two downstream ports C and D, and two positions I and II.

Port A is connected to the transmission duct 54. Said transmission duct transmits a boost pressure that the first pilot valve 68 can use to control the activation valve. Port B is connected to the removal duct 70 which is itself connected to the unpressurized reservoir 52. Port C is connected to the hydraulic chamber 134B of the valve 134, increase in the pressure in this chamber urging the activation valve 134 to go over to its first position (unassisted mode); port D is connected to the other chamber 134A of the valve 134, increase in the pressure of this chamber urging the valve 134 to go over to its second position (assisted mode).

The first pilot valve 68 is also provided with a return spring that urges it to stay in the first position I.

In the first position I, ports A and C are interconnected, and ports B and D are interconnected; and in the second position II, ports A and D are interconnected, and ports B and C are interconnected.

Since the first pilot valve 68 is situated downstream from the bypass valve 150, it plays an active part only when the bypass valve is in the position II, and thus when the boost pressure prevails in the transmission duct 54.

Under these conditions, action on the valve 68 makes it possible to cause the activation valve to go over to the position I or II, depending on whether the pilot valve is itself placed in position I or in position II. When the first pilot valve 68 is in position I, the boost pressure is transmitted to the chamber 134A, and atmospheric pressure is maintained in the chamber 134B, so that the activation valve 134 is placed in position I (unassisted mode); and vice versa.

The apparatus 22 further includes a second pilot valve 72 that controls the pressure control valve 36.

Firstly, the arrangement of the pressure control hydraulic valve 36 is specified below. This valve has two upstream ports A and B, one downstream port C, and one hydraulic control chamber 361. Port C of the valve 36 is connected to a port B of the activation valve 134.

The valve 36 has two positions I and II.

In the first position I, ports A and C are interconnected, and port B is isolated. In the second position II, ports B and C are interconnected, and port A is isolated.

The valve 36 is also provided with a return spring that urges it to stay in the first position I.

The second pilot valve 72 is a solenoid valve having two upstream ports A and B, and one downstream port C. It can take up two positions I and II.

The ports A and B are connected respectively to the transmission duct 54, and to the removal duct 70. The port C is connected to the hydraulic control chamber 361 of the pressure control valve 36.

The second pilot valve 72 is also provided with a return spring that urges it to stay in the first position I.

In its first position I, the second pilot valve 72 interconnects ports B and C, A remaining isolated. In its second position II, the second pilot valve 72 interconnects ports A and C, B remaining isolated.

In the same way as for the first pilot valve, the valves 36 and 72 play active parts only during the assistance stages, i.e., in this example, when the bypass valve 150 is placed in position II. The boost pressure then prevails in the transmission duct 54 (connected to port A of the valve 72), while a pressure equal to atmospheric pressure prevails in the removal duct 70 (connected to port B of the valve 72).

Under these conditions, the valve 72 makes it possible to apply either the boost pressure or a pressure equal to atmospheric pressure to the hydraulic control chamber 361 of the valve 36, depending on whether it is placed in its first position or in its second position. The pressure in the chamber 361 constrains the valve 36 to take up its first position I if the valve 72 is in its first position I, or to take up its second position if the valve 72 is in its second position II.

This arrangement thus makes it possible to select the pressure that is to be applied to port B of the activation valve 134. When said activation valve is in its first position I, the pressure in the port B is transmitted to the motor ducts 30, 32. Conversely, when the activation valve 134 is in its second position II, port B is isolated.

Finally, the apparatus 220 includes an additional pressurized fluid source, namely a fluid accumulator 74, operation of which is regulated by an accumulator valve 76, disposed on an accumulator duct that connects the accumulator 74 to the remainder of the apparatus.

The accumulator valve 76 has an upstream port A, two downstream ports B and C, and a hydraulic control chamber 761. Port A is connected to the accumulator. Port B is connected to the common segment 2401 of the casing duct 240. This makes it possible, in order to declutch the motors 26A, 26B, to inject fluid from the accumulator into the casings of the motors, in order to cause the pressure therein to increase again, via the casing duct 240.

Port C is connected to the transmission duct 54.

The accumulator valve 76 can take up a first position I, in which ports A and C are interconnected, and port B is isolated, and a second position II, in which ports A and B are interconnected, and port C is isolated.

The accumulator valve 76 is also provided with a return spring that urges it to stay in its first position I.

The control chamber 761 of the accumulator valve 76 is connected to the upstream portion 561 of the bypass duct 56. As a result of this link:
- If the bypass valve 150 is in position I (unassisted mode), the boost pressure (the value of which in this mode is set at a "pump protection" value) is applied to the hydraulic chamber 761, and thus the accumulator valve is placed in position II, in which the accumulator is connected to the middle portion of the bypass link, which is maintained at a pressure of 0.5 bars (motor protection pressure). Thus, the accumulator is not really put under pressure and is not dangerous in any way; however,
- If the bypass valve 50 is in position II (assisted mode), a pressure equal to atmospheric pressure is applied to the hydraulic chamber 761. The accumulator valve is placed in position I, i.e. the accumulator is connected to the transmission duct 54, and is thus brought to the boost pressure.

Due to the link between the port D of the bypass valve and the hydraulic control chamber 761, the accumulator valve and the bypass valve are coupled together, and the position of the bypass valve imposes the position taken up by the accumulator valve.

Downstream from the point at which port B of the valve 76 is connected to the casing duct 240 (i.e. between that point and the middle portion 562 of the bypass duct 56), the casing duct 240 is duplicated over a short segment.

A constriction 282 is interposed on a first branch of this segment; a check valve 281 for filling the casing is interposed on the second branch of this segment and is mounted in such a manner as to enable fluid to be injected into the casings of the motors 26A, 26B.

For the apparatus 220, the constriction 282 constitutes means for limiting the flow of fluid in the casing duct 240.

During declutching of the motors, the check valve 281 enables a fraction of the fluid flowing through the middle portion 562 of the bypass duct to be directed towards the casing ducts. However, at least in a first stage of the declutching, a large fraction of the fluid injected into the casings may be fluid supplied by the accumulator 74 via port B of the valve 76.

Advantageously, the clutching means are suitable, during the operation of declutching the motor, for connecting the accumulator 74 to the casing duct 240 on the casing side of the first constriction 282 and/or the check valve 281 for filling the casing. Since the fluid supplied by the accumulator does not go via the constriction 282, the fluid flow rate supplied may be large, thereby facilitating quick declutching.

Finally, the link between the port B of the valve 76 and the segment 2401 is connected to the boost duct 41 via a pressure-limiting check valve 280. This valve is mounted in such a manner as to enable fluid to go from said link towards the boost duct 41, without going via the valve 150. This therefore constrains the pressure in the casing duct 240 not to exceed the pressure in the boost duct 41.

The check valve 280 is optional, it being possible for the constriction 282 to be dimensioned so that it alone removes the fluid coming from the casings during the clutching.

The apparatus 220 is implemented as follows.

The bypass valve 50, the activation valve 134, the pressure control valve 36, and the first and second pilot valves 68 and 72 constitute the main members of the clutching means of the apparatus 220.

The hydraulic transmission apparatus 22 is implemented by performing a succession of operations for activating or deactivating the various valves of the apparatus.

These various operations may be controlled automatically, on the basis of the request for activation (or, respectively, deactivation) of the assistance made by the driver of the vehicle, via an electronic control unit or "ECU" (not shown).

Unassisted Mode

In unassisted mode, the bypass valve 150 is in the position I, and the fluid delivered by the boost pump 25 then flows along the bypass link 64 in order to return to the reservoir 52. It thus follows a relatively short circuit, without using the various valves of the apparatus 220 (except for the bypass valve 50). The accumulator valve 76 is in position II. The accumulator empties via the valve 62 of the bypass link. The activation valve 134, the pilot valves 68 and 72, and the pressure control valve 36 are in position I. The pump protection pressure prevails in the upstream portion of the bypass link 64, and therefore in the pump ducts, thereby making it possible to protect the main pump 24. The main pump is driven by the engine 18, but does not deliver.

The casing duct 240 is connected to the middle portion 562 of the bypass duct, in which a pressure of 0.5 bars prevails. This pressure is sufficient (and so chosen) to guarantee that the pistons remain in their retracted positions inside the cylinders.

Activating the Assistance

In order to activate the hydraulic assistance, the driver sends an assistance command that activates the auxiliary transmission 220.

For this purpose the electronic control unit ECU activates the bypass valve 50 an places it in position II.

The accumulator valve 76 reacts immediately and goes from position II to position I. The accumulator thus finds itself connected to the boost pump via the boost duct and via the transmission duct 54. It fills and rapidly reaches the pressure delivered by the boost pump.

Synchronizing the Pump and Causing the Pistons to Extend

When the accumulator is full, the ECU triggers synchronization of the main pump 24, by progressively increasing the cylinder capacity of the pump, to a target value at which the cylinder capacity is stabilized. This target value is determined by the ECU in such a manner that the pump can drive the motors 26A and 26B at a speed of rotation equal to the speed of rotation of the wheels of the vehicle.

The clutching operation then starts, by activating the pilot valve 68, which goes to position II. The boost pressure is thus applied to the chamber 134A and not to the chamber 134B; the activation valve 134 thus goes from position I to position II. Thus, the pump ducts 28A, 28B are put into communication with the motor ducts 30, 32.

The pistons, which, until then, were retracted inside the cylinders, then extend from their cylinders, in the sequence presented above with reference to FIG. 2. They thus progressively reach their working positions in contact with the cam.

During the clutching operation, while the pistons are extending from the cylinders, the casing duct 240 removes the fluid from the space inside the motors 26A, 26B to the reservoir 52.

Advantageously, during this stage, the accumulator 74 is brought on line on the transmission duct 54 at the same time as the boost pump 25 so as to supply fluid and so as to fill the motor ducts 30 and 32. Thus, the accumulator facilitates and accelerates filling and building up pressure in the motor ducts, and thus enables the motors 26A, 26B to be clutched rapidly.

During the assistance stage, the accumulator 74 remains connected to the transmission duct 54 and remains subjected to the boost pressure.

Figure 4:
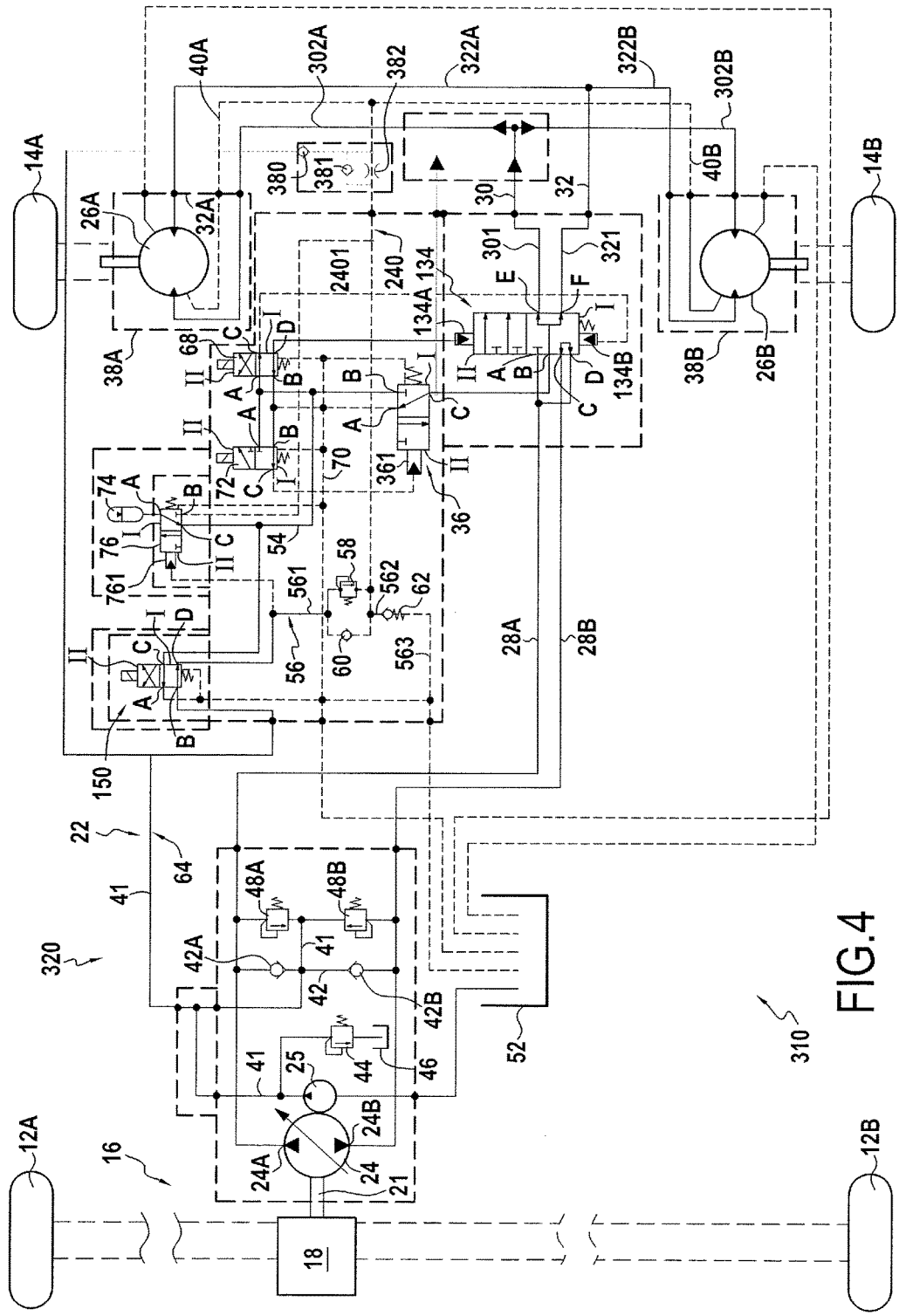

FIG. 4 shows a vehicle 310 on which apparatus 320 of the invention is mounted.

The apparatus 320 includes a constriction 382 and check valves 380 and 381 having substantially the same functions as the corresponding elements 282, 280, 281 of the second embodiment.

The filling check valve 381 and the constriction 382 are mounted in parallel on a duplicated segment of the common segment 3401 of the casing duct 340.

This duplicated segment, and thus the constriction 382, are situated between the point at which port B is connected to the casing duct 340 and the casings.

Thus, the constriction 382 is disposed on the casing duct 340 between the casing (the casings 38A, 38B) and the accumulator 74. During the operation of clutching the motor, the fluid removed from the casing can therefore be directed to the accumulator 74 only via the constriction 382, thereby making it possible to avoid pressure peaks in the accumulator.

The pressure-limiting check valve 380 is connected downstream from the boost duct 41, and upstream from the casing duct 340, also between the casings and the duplicated segment. It thus makes it possible to remove fluid from the casings without that fluid having to go through the constriction 382 (or through the filling valve 381, which does not allow fluid to pass through in this direction).

The check valves 280 and 281 and the constriction 282 are grouped together in the same valve body.

Figure 5:
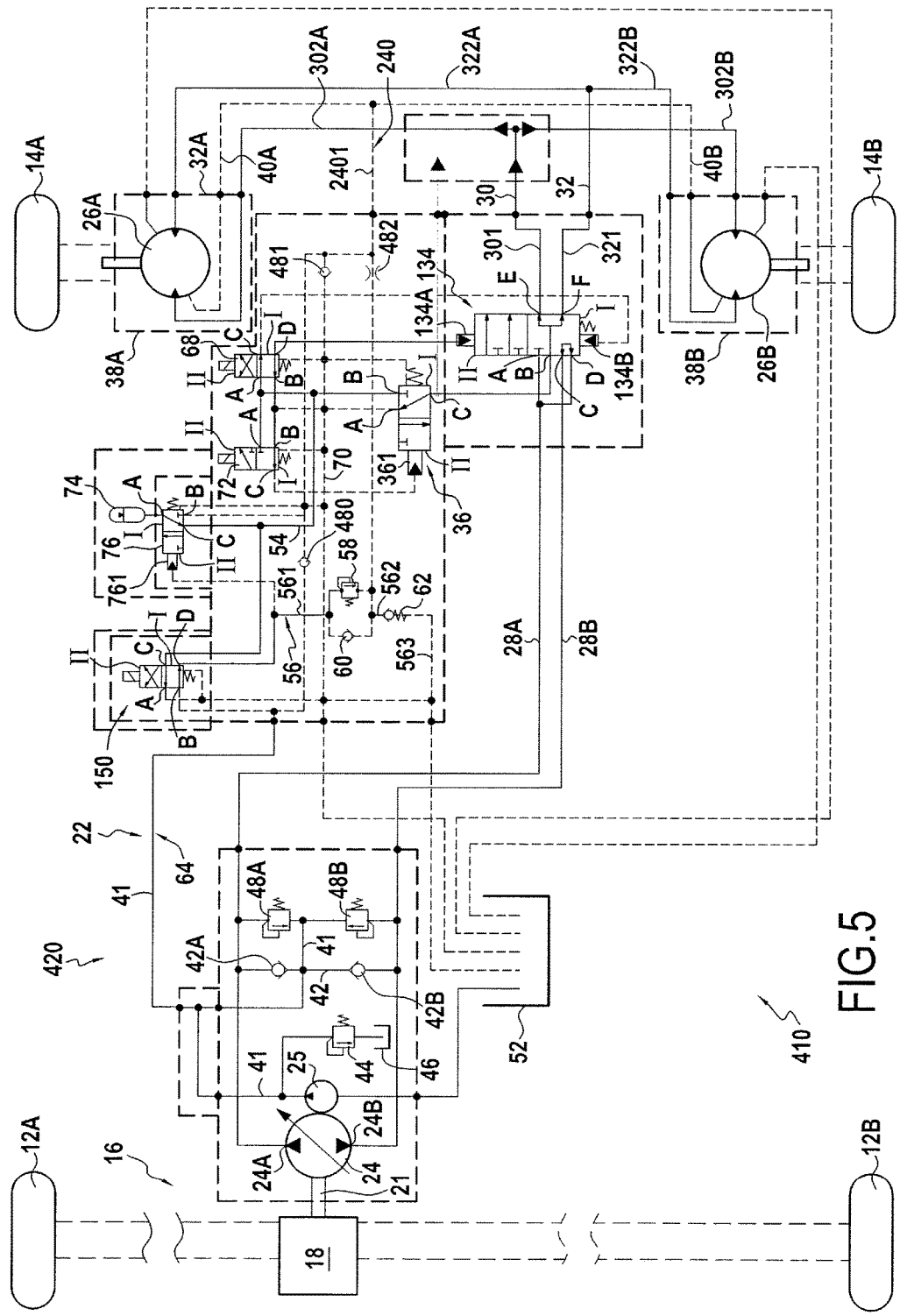

The apparatus 420 as mounted on a vehicle 410 and shown in FIG. 5 includes a constriction 482 and check valves 480 and 481 having the same functions as the corresponding elements 282, 280, 281 of the second embodiment.

The pressure-limiting check valve 480 and the constriction 482 are identical to the check valve 280 and to the constriction 282 of the second embodiment (FIG. 3).

Conversely, the filling check valve 481 is connected in specific manner. Thus, it is connected downstream, not to the middle portion 562 of the bypass duct but rather directly to the unpressurized reservoir 52, via the removal duct 70. In addition, the duct 70 is connected to port A of the pressure control valve 36.

During declutching, the valves 72, 36, and 34 are placed in position I. At this instant, the motor ducts 30, 32 are connected to the removal duct 70 and they remove a fraction of the fluid contained in the cylinders, while the pistons are retracting into the cylinders. The fluid removed via the line 70 is directed via the valve 481 towards the casings of the motors 26A and 26B. The duct 70 then acts as a fluid supply line.

Preferably, the declutching operation may be performed in two steps:

In a first step, the fluid removed from the cylinders is directed towards the casings 38A, 38B via the filling valve 481, as indicated above.

After a brief lapse of time, after a certain volume of fluid has thus been transferred, the valve 150 is deactivated, going to position I and causing the accumulator valve 76 to go to position II. The accumulator is thus brought on line with the casing duct via port B of the valve 76, and injects fluid into the casing ducts so as to maintain relatively high pressure therein, and so as to accelerate the declutching.

Thus, in this embodiment, in order to declutch the motor, the declutching means are suitable, in a first step, for connecting the motor ducts to the casing duct, and, in a second step, for connecting the accumulator to the casing duct.

This sequence makes it possible to accelerate the declutching and to reduce the size of the boost pump of the apparatus.

Figure 6:
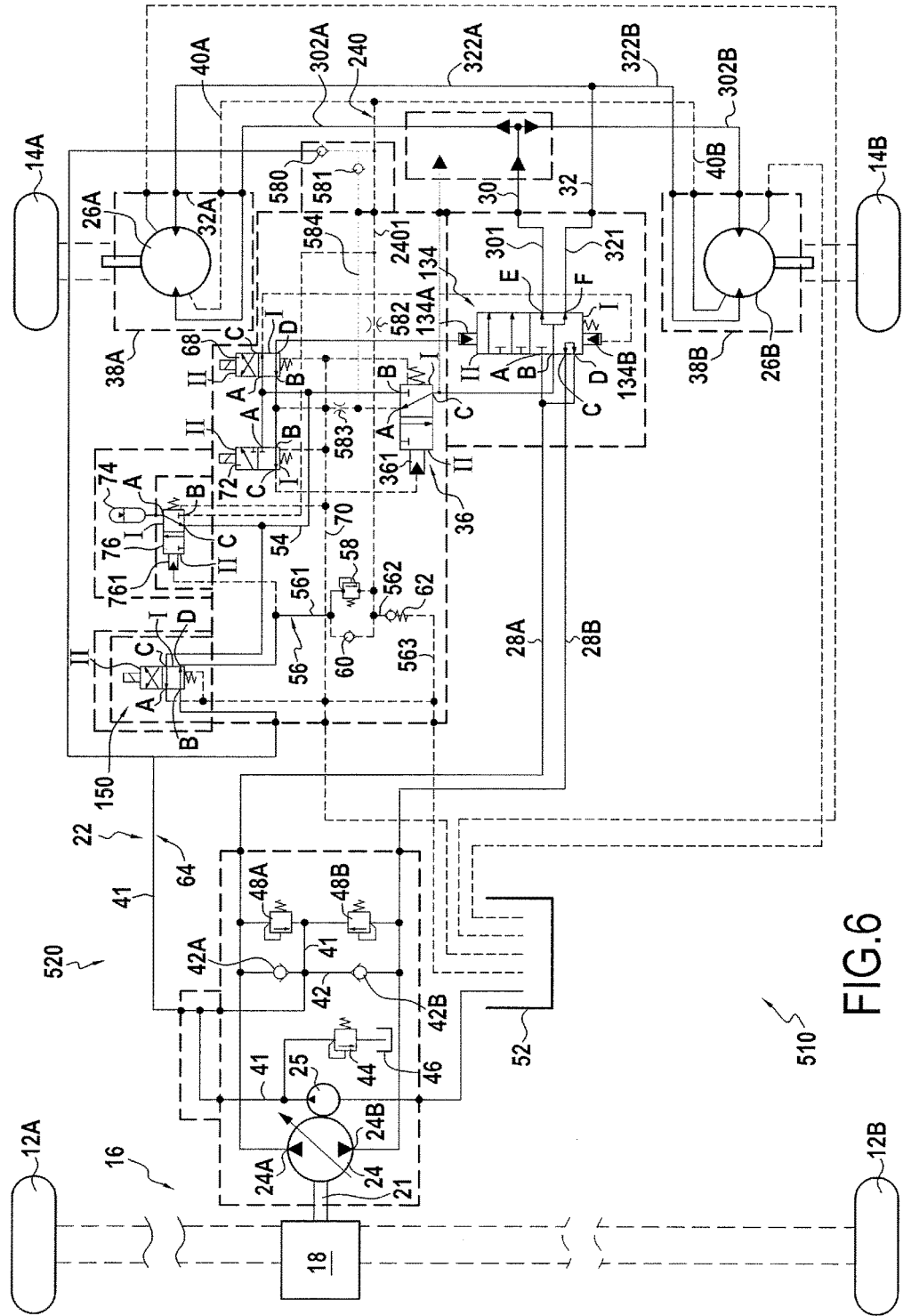

FIG. 6 shows another apparatus 510 of the invention that is analogous to the apparatuses of FIGS. 3 to 5.

A constriction 582 having the same function as the constriction 282 is disposed on the casing duct 240.

In this embodiment, a pressure-limiting check valve 580 analogous to the valve 280 is mounted, like that valve, on a duct connecting the boost duct 41 to the casing duct 240, and joining said casing duct upstream (relative to a flow of fluid being removed from the casings) from the constriction 582.

In addition, the apparatus 520 includes a filling check valve 581 analogous to the check valve 481, arranged in the same valve body as the check valve 580, and disposed in the following manner:

Port A of the valve 36 is connected to the removal duct 70. A constriction 583 is disposed in this line that may be referred to as the "removal line" while declutching is taking place. Between the constriction 583 and the valve 36, a fluid recovery link 584 mounted as a branch off the removal line connects the removal line to the casing duct 240 upstream from the constriction 582, via the filling check valve 581.

This fluid recovery link 584 makes it possible to direct a fraction of the fluid coming from the motor ducts 30, 32 to the casing duct 240 while the motors are being declutched.

Thus, in this apparatus 520, 15, in order to declutch the motor or the motors, the clutching means are suitable for connecting the motor ducts 30, 32 firstly to an unpressurized reservoir 52 via a removal line including a constriction 583, and secondly to the casing duct 240 via a fluid recovery link 584 including a check valve 581, the fluid recovery link 584 connecting to the removal line between the motor(s) and said constriction 583, and the check valve 581 allowing the fluid to pass through only towards the casing duct 240, whereby the increase in pressure in the removal line caused by said constriction 583 during the declutching operation causes fluid to be injected into the casing(s).

The invention claimed is:

1. Hydraulic transmission apparatus comprising at least one hydraulic motor having radial pistons, said motor comprising:
   a casing;
   inside the casing, a cylinder block that comprises a plurality of cylinders each cylinder containing a slidably mounted piston and being disposed radially relative to an axis of rotation of the motor; and
   an undulating cam for the pistons;
   the apparatus further comprising:
   two motor ducts respectively for a fluid feed and for a fluid discharge of the motor, said motor ducts being suitable for being put into communication with said cylinders; and
   a casing duct connected to an internal space provided inside the casing and in which a casing pressure prevails;
   the motor being suitable for being clutched, in which state the pistons slide in the cylinders while being held in contact with the cam, and the motor is suitable for generating outlet torque under the effect of a difference in pressure between the motor ducts, and for being declutched, in which state the pistons are held in retracted position inside the cylinders;
   the apparatus comprising, disposed on the casing duct, a limiting valve or a restrictor configured to limit the flow of fluid in said casing duct so as to cause an increase in pressure in the casing duct while fluid flows out of the internal space of the motor via the casing duct during clutching;
   and wherein none of the two motor ducts is connected with said limiting valve or restrictor.

2. Apparatus according to claim 1, further comprising a pressure limiter disposed on the casing duct and suitable for limiting the increase in pressure in the casing.

3. Apparatus according to claim 1, further comprising a pressure-limiting check valve, mounted in parallel with said limiting valve or restrictor disposed between the casing duct and an auxiliary source of pressurized fluid, and allowing fluid to flow only in the direction going from the casing towards said source.

4. Apparatus according to claim 1, wherein the apparatus is configured to maintain the second motor duct at a second pressure less than the clutching pressure during the clutching operation, and said limiting valve or restrictor disposed on the casing duct is dimensioned in such a manner that, during a major fraction of the clutching operation, the casing pressure remains between the first pressure and the second pressure.

5. Apparatus according to claim 1, wherein, in parallel with said limiting valve or restrictor disposed on the casing duct, the apparatus is configured, during the clutching operation, to connect the casing duct via a rated valve to the second motor duct, in order to limit the pressure in the casing.

6. Apparatus according to claim 1, further comprising a main pump, and wherein:
   the apparatus is configured to put a main delivery orifice of the main pump into communication with the first motor duct during the clutching operation, so as to make it possible to feed the motor;
   the motor is connected to at least one wheel so as to drive it; and
   the apparatus is configured, before the clutching operation is performed, to synchronize the main pump by causing the cylinder capacity of said pump to vary until it reaches a value making it possible to drive the motor at a speed of rotation different by less than 25% from a speed of the wheel.

7. Apparatus according to claim 1, further comprising a main pump and an auxiliary pump, and wherein the apparatus is configured to connect a delivery orifice of the auxiliary pump to the first motor duct during the clutching operation.

8. Apparatus according to claim 1, wherein the apparatus is configured, during the clutching operation, to connect the casing duct to the second motor duct.

9. Apparatus according to claim 1, wherein, in parallel with said limiting valve or restrictor disposed on the casing duct, the apparatus is configured to connect the casing duct to a fluid supply duct via a check valve for filling the casing, making it possible to supply fluid to the casing during the operation of declutching the motor.

10. Apparatus according to claim 9, wherein the apparatus is configured, during the operation of declutching the motor, to connect the accumulator to the casing duct on the same side of the first constriction as the casing and/or the check valve for filling the casing.

11. Apparatus according to claim 1, further comprising an accumulator suitable for feeding the casing duct for putting this duct under pressure during an operation of declutching the motor, thereby making it easier for the pistons to retract into the cylinders.

12. Apparatus according to claim 11, wherein the said limiting valve or restrictor disposed on the casing duct comprises a first constriction, and wherein said first constriction is disposed on the casing duct between the casing and the accumulator, and, during the operation of clutching the motor, the fluid removed from the casing can be directed towards the accumulator via the first constriction only.

13. Apparatus according to claim 11, wherein the apparatus is configured, during the operation of declutching the motor, to connect the accumulator to the casing duct on the same side of the first constriction as the casing and/or the check valve for filling the casing.

14. Apparatus according to claim 1, wherein the apparatus is configured, during the operation of declutching the motor, to connect a accumulator to the casing duct on the same side of a first constriction as the casing and/or the check valve for filling the casing.

15. Apparatus according to claim 11, wherein, in order to declutch the motor, the apparatus is configured, in a first step, to connect the motor ducts to the casing duct, and, in a second step, to connect the accumulator to the casing duct.

16. Apparatus according to claim 15, wherein, in order to declutch the motor, the apparatus is configured to connect the motor ducts firstly to an unpressurized reservoir via a removal line including a constriction, and secondly to the casing duct via a fluid recovery link including a check valve, the fluid recovery link connecting to the removal line between the motor(s) and said constriction, and the check valve allowing the fluid to pass through only towards the casing duct, whereby the increase in pressure in the removal line caused by said constriction during the declutching operation causes fluid to be injected into the casing.

17. Apparatus according to claim 1, wherein said limiting valve or restrictor disposed on the casing duct is a valve.

18. Apparatus according to claim 1, wherein said limiting valve or restrictor disposed on the casing duct is a restrictor.

19. Apparatus according to claim 1, configured so that, when the pistons extend, since fluid removal from the casing is limited by the limiting valve or restrictor disposed on the casing duct, the pressure inside the casing increases, thus forming a back pressure having an effect opposing the effect of the pressure in the cylinders; and once the clutching is performed, the back pressure falls spontaneously without requiring any action to be taken.

20. Hydraulic transmission apparatus comprising at least one hydraulic motor having radial pistons, said motor comprising:

a casing;
inside the casing, a cylinder block that comprises a plurality of cylinders each cylinder containing a slidably mounted piston and being disposed radially relative to an axis of rotation of the motor; and
an undulating cam for the pistons;
the apparatus further comprising:
two motor ducts respectively for the fluid feed and for the fluid discharge of the motor, said motor ducts being suitable for being put into communication with said cylinders; and
a casing duct connected to an internal space provided inside the casing and in which a "casing pressure" prevails;
the motor being suitable for being clutched, in which state the pistons slide in the cylinders while being held in contact with the cam, and the motor is suitable for generating outlet torque under the effect of a difference in pressure between the motor ducts, and for being declutched, in which state the pistons are held in retracted position inside the cylinders;
the apparatus comprising at least one valve and at least one pump, which are configured, in order to perform the clutching of the motor, to bring a first one of the motor ducts to a "clutching" first pressure that is higher than casing pressure while also making it possible to remove fluid via the casing duct;
the apparatus comprising, disposed on the casing duct, a limiting valve or a restrictor configured to limit the flow of fluid in said casing duct, in a manner such as to cause the pressure inside the casing to increase during the clutching operation;
and wherein none of the two motor ducts is connected with said limiting valve or restrictor.

21. Apparatus according to claim 20, wherein said limiting valve or restrictor disposed on the casing duct is a valve.

* * * * *